United States Patent
Stippler et al.

(10) Patent No.: US 6,761,917 B1
(45) Date of Patent: *Jul. 13, 2004

(54) METHOD AND DEVICE FOR CONTROLLING THE WORT FLOW FROM A LAUTER TUN

(75) Inventors: Kurt Stippler, Marzling (DE); Klaus Wasmuht, Ellingen (DE); Reinhard Pritscher, Ergolding-Landshut (DE)

(73) Assignee: Anton Steinecker Maschinenfabrik GmbH, Freising/Attaching (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 959 days.

(21) Appl. No.: 08/914,346

(22) Filed: Aug. 15, 1997

Related U.S. Application Data

(63) Continuation of application No. 08/578,664, filed on Jan. 19, 1996, now abandoned.

(30) Foreign Application Priority Data

Jul. 19, 1993 (DE) .......................................... 43 24 157

(51) Int. Cl.$^7$ .............................. C12C 7/14; C12C 7/17
(52) U.S. Cl. ............................. 426/29; 426/16; 426/18; 99/279
(58) Field of Search ............................. 426/16, 18, 29; 99/279

(56) References Cited

FOREIGN PATENT DOCUMENTS

| DE | 139 480 | 1/1980 | ............. C12C/7/14 |
| --- | --- | --- | --- |
| DE | 139480 | * 2/1980 | |
| DE | 222329 | * 5/1985 | |
| DE | 3344716 | * 6/1985 | |
| DE | 228821 | * 10/1985 | |
| EP | 0 362 793 | 4/1990 | ............. C12C/7/14 |
| GB | 151183 | * 8/1981 | |
| SU | 879568 | * 11/1981 | |
| WO | 95/03394 | * 2/1995 | |

OTHER PUBLICATIONS

Vermiere, H., European Brewery Convention, 1981, pp. 1981, pp. 81–88.*

Seborg et al, Process Dynamics and Control, Wiley & Sons, New York, pp. 183–194, 1989.*

Abstract Oct. 23, 1985, AN 86–048759, and DD, A, 228 821 (VEB. WISS. TECH. GARU N.).

Abstract Nov. 1981, AN82–74336E, and SU, A, 879 568 (PISCHEPROMAVTOMATI) 7.

* cited by examiner

Primary Examiner—Curtis E. Sherrer
(74) Attorney, Agent, or Firm—Seed Intellectual Property Law Group PLLC

(57) ABSTRACT

The present invention relates to a method and a device for controlling the wort flow from a lauter tun. To shorten the lautering time, according to the present invention a second increased outflow value which is to be reached within a given time interval is predetermined in the course of the total sequence of a brewing process (first wort, second worts) in at least one phase (trending phase), based on a predetermined outflow value of the wort outflow, the increase in flow rate/per time unit (increase value) as is required for attaining the second outflow value is determined on the basis of these values, and the determined increase value is used as a set value for controlling an outflow regulator.

13 Claims, 4 Drawing Sheets

METHOD AND DEVICE FOR CONTROLLING THE WORT FLOW FROM A LAUTER TUN

CROSS-REFERENCE TO RELATED APPLICATION

This is a continuation application of U.S. patent application Ser. No. 08/578,664, filed Jan. 19, 1996, now abandoned.

TECHNICAL FIELD

The present invention relates to a method for controlling the wort flow from a lauter tun and a device for performing such a method.

BACKGROUND OF THE INVENTION

A method for controlling wort outflow during brewing is, for instance, known from the European patent application EP-A-0362 793. In this method, the wort outflow quantity is measured and compared with a predeterminable outflow value. This outflow value serves as a set value, the actually measured wort outflow quantity serving as an actual value. The raking machine which is arranged within the lauter tun is lifted or lowered in response to the difference between the actual value and the set value. When the flow rate of the wort decreases, the raking device is moved into a lower position to loosen the grain bed which has settled on, the false bottom of the lauter tun. The resistance of the grain bed is reduced by the loosening operation, so that the wort flow rate can be increased. The time needed for lautering the wort on the whole can be reduced. There may also be set different outflow values in different phases so as to be able to work with corresponding suitable outflow values in the individual sections (first wort recovery, second worts).

Although the lauter time can be reduced with this method, the lauter process remains, in the present method, that process in wort production that requires most of the time and should therefore be further reduced with a view to a further increase in the brew sequence, i.e., without impairment to the wort quality. Furthermore, it is desirable to have possibilities of individual adaptation for the most different types of beer, raw material compositions, grist compositions, mash consistencies and loads on the lauter tuns.

SUMMARY OF THE INVENTION

It is therefore the object of the present invention to further shorten the time for lautering the wort in a method and in a device of the above-mentioned type, with such a shortening being possible under the most different conditions and with the most different types of beer, raw material compositions, etc.

This object is achieved according to the invention in that in the course of the total sequence of a brew process (first wort, second worts) a second increased outflow value which is to be reached within a specific time interval is predetermined in at least one phase (trending phase), based on the predetermined outflow value of the wort outflow, that the increase in flow rate/per time unit (increase value) as required for reaching the second outflow value is determined on the basis of these values, and that this determined increase value is used as a set value for controlling an outflow regulator.

Hence, at least one phase, which may be designated as trending, is included in this invention in a complete lauter process which ranges from the first wort recovery to the second worts. In this phase, the wort outflow quantity is not regulated to have a constant wort outflow value, but is regulated on the basis of a rising, especially staircase-like outflow curve which is determined in that, by setting a specific increased outflow quantity which is to be reached after a certain time, the resultant rise is calculated for the increase in flow rate per time unit (set value).

The outflow quantity can be varied by regulating the effective flow opening of a regulating valve, or by regulation via the opening angle of a lauter flap.

In a very advantageous embodiment of the invention, the raking machine provided within the lauter tun is included in or combined with the control loop for controlling the outflow quantity according to EP-A-0326 793.

This may advantageously be done in that, when a specific stepwise increase in the opening angle of the lauter flap by a specific angular amount (e.g. 8%) does not yield a corresponding increase in-the flow rate during the trending phase, the raking machine is slightly lowered to effect an increase in the outflowing wort amount.

This trending phase may be carried out until the second increased outflow value has been reached or until the flap position has reached a limit value which is also predeterminable (e.g. 80% total opening angle), so that a further increase no longer yields a significant increase in flow rate.

It is advantageous in the course of the trending phase when the set value can be varied. In particular, the set value is reduced if an increased flow rate of the wort cannot be reached, whereby the grain bed is prevented from getting stuck or from solidifying. This would lead to a deep cut which is not desired in the trending phase. As soon as the flow rate of the wort has stabilized over a certain period of time, the increase in the flow rate per time unit is continued with the original set value.

In a lauter tun of the type as described at the outset, the device for performing the method provides for an outflow regulator which is connected to the control means for regulating the amount of the outflowing wort.

This measure makes it possible to perform the method, since the outflow regulator can then be included in the control loop and can automatically be influenced by the control means in accordance with the respectively desired values.

BRIEF DESCRIPTION OF THE DRAWINGS

The invention shall now be explained in more detail with reference to the embodiment illustrated in the drawing, in which.

DETAILED DESCRIPTION A PREFERRED EMBODIMENT

Figure 1:
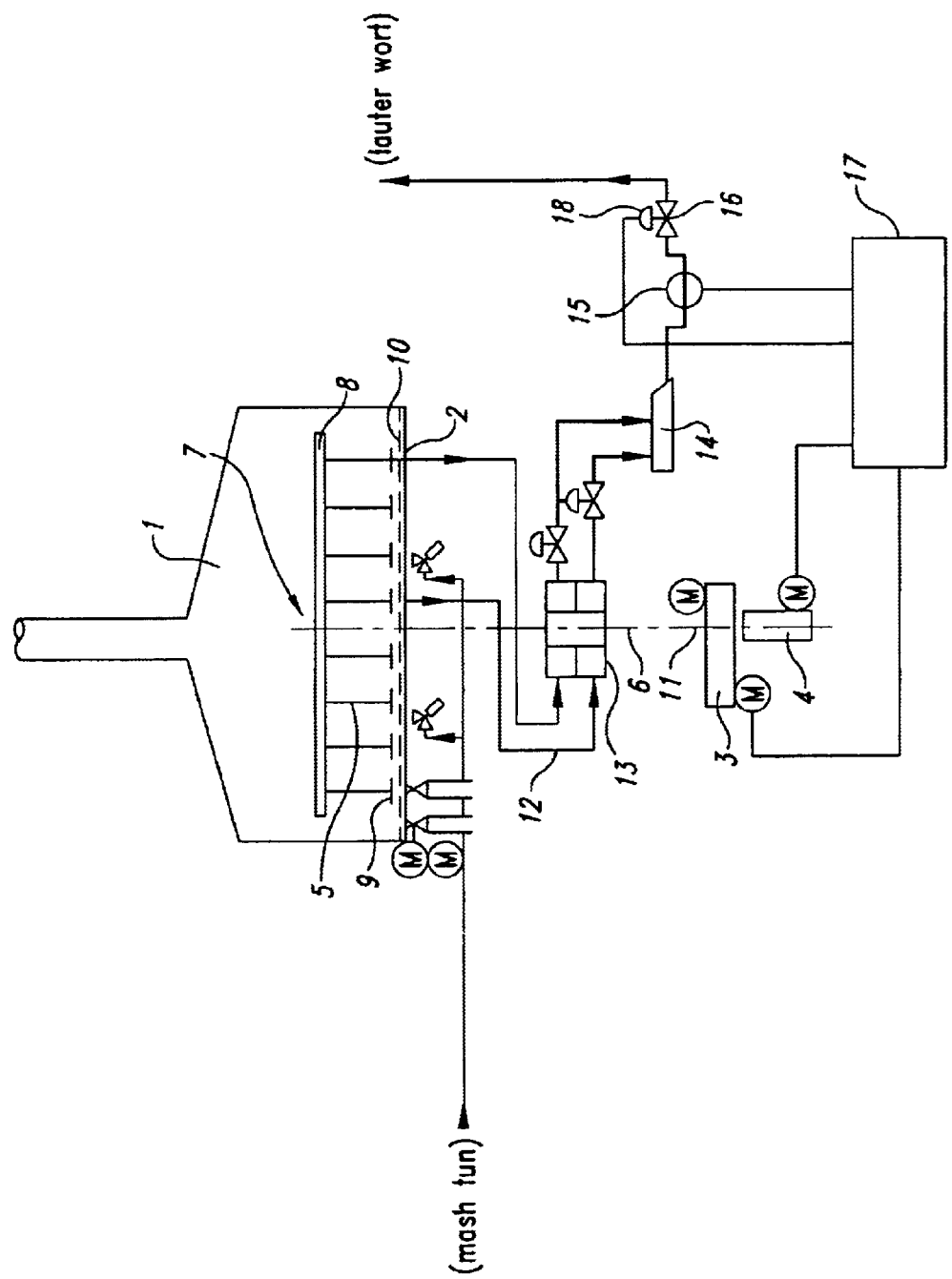
FIG. 1 is a diagrammatic view of a device having a structure according to the invention.

The device comprises a lauter tun 1 which is arranged on a support device (not shown) for creating an installation place below bottom 2 of lauter tun 1 for the installation of a drive device 3 and a lifting and lowering device 4 for the raking device 5 which is arranged within lauter tun 1. The raking device 5 comprises a drive shaft 6 which is supported in a rotational and axially displaceable manner. A plurality of horizontal arms 8 of which each supports a number of raking knives 9 for a grain bed which during the lautering process settles as residue on the false bottom 10 of lauter tun 1 are circumferentially secured in equally spaced-apart relationship in the upper end section 7 of drive shaft 6. With its lower end section 11; drive shaft 6 of the raking device is in engagement with the drive means 3 and the lifting and lowering device 4.

The lauter wort which has been removed from lauter tun 1 passes via a discharge pipe 12 into collecting pot 13 and from said pot into a central pipe 14 which has arranged downstream thereof a flow rate meter 15 and an outflow regulator 16. The flow rate of the lauter wort is measured with the aid of the flow rate meter 15.

Flow rate meter 15 is connected to control means 17 which, in turn, is connected to a regulating element 18 of outflow to regulator 16 and to drive device 3 of the lifting and lowering device 4 of raking device 5.

The drive motors for the lifting and lowering device and for the rotational movement of the raking device are designated by M.

Figure 2:
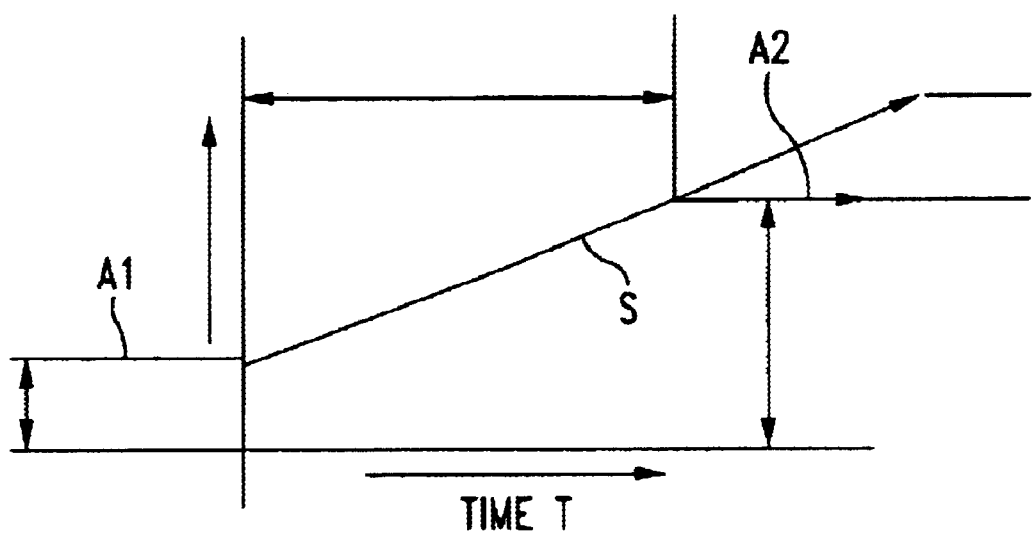
FIG. 2 is a diagrammatic explanatory sketch for illustrating the principle of the invention.

The method according to the invention can be carried out with this device as follows:

At the beginning of the lautering process, the initial height of the raking machine, the flow rate and the opening angle of the lauter flap or a regulating valve serving as an outflow regulator 16 are defined. The flow rate value depends on the composition of the grist, the type of beer, the raw material used, etc. A suitable flow rate value is then defined in accordance with empirical values, and the opening angle of the lauter flap is set accordingly. These values are maintained up to a specific adjustable total lauter amount or a specific adjustable lauter time, and the raking machine is optionally used to maintain the desired flow rate. This value, to which the flow rate is first set, is designated in FIG. 2 by A1 and represents the first outflow value. This value may, for instance, be 300 or 350 hl/h or a corresponding proportional flow rate value.

Upon initiation of the trending phase according to the invention, a second, considerably increased flow rate value or a correspondingly increased proportional flow rate value, which is the second outflow value A2, is supplied to control means 17, and the control means is informed about the time T within which this considerably increased outflow value A2 is to be reached. The control means can then calculate rise S, which is the increase between the first outflow value A1 and the second outflow value A2 within a selected unit of time, such as a hour. This increase in the flow rate per time unit as represented by rise S is then given as a set value to the control means 17 of the outflow regulator 16 during the trending phase.

Figure 3:
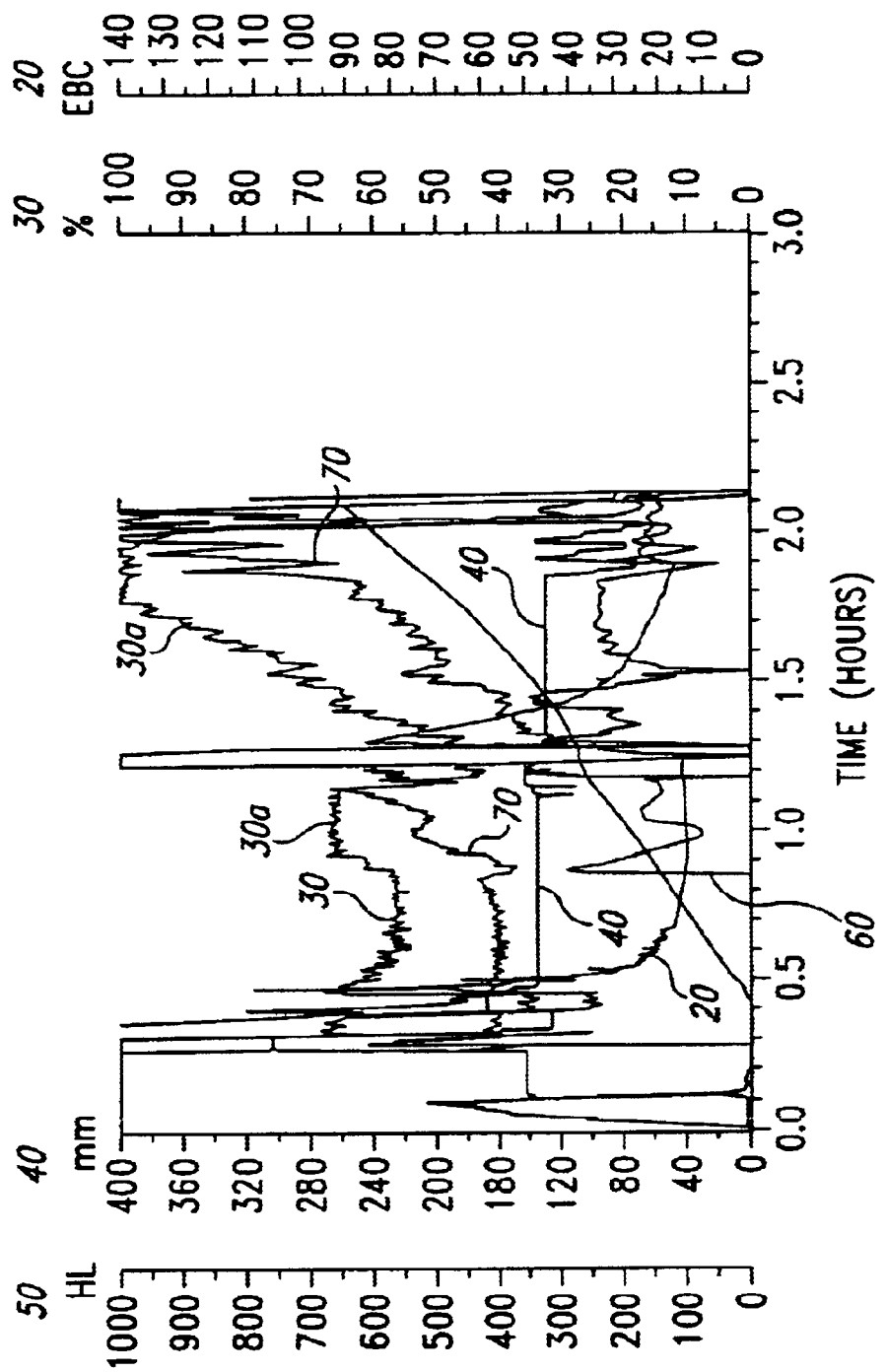
FIG. 3 shows an actual sequence program measured during testing for further explanation of the method of the invention.

FIG. 3 illustrates an actually measured diagram which discloses a whole lautering process in time sequence and in coordination of the individual parameters.

Reference numeral 20 designates the course of turbidity, reference numeral 30 the flow rate in percentage (%), reference numeral 40 the lift of the raking machine in mm, reference numeral 50 the total flow in hl, reference numeral 60 the prevailing overpressure in the lauter tun, and finally, reference numeral 70 the opening angle of regulating valve or the lauter flap serving as the outflow regulator 16.

As can easily be seen in the left half of the illustrated diagram, the control of the outflow quantity, especially with first wort recovery, is essentialy performed according to two different set values up to the time of about 1.2 hours. The first flow-rate is represented by the line in which reference numeral 30 ends in the flow rate curve (in percentage). An increase 30a in flow rate 30 is accompanied by the feeding of $CO_2$ into the lauter tun. With a decrease in the $CO_2$ content, the opening angle of the outflow regulator 16 (FIG. 1) is further increased to be able to keep the set flow-rate value constant. After a certain angular position has been reached, the set value is no longer maintained by further opening the angle of the outflow regulator, but lowering of the raking device 5 is additionally started, as can be seen by looking at the raking-device lifting-height curve 40. Nevertheless, if the flow rate decreases further, a first deep cut is made, and the trending phase is then initiated. Trending with the rise or increase value for the flow rate per time unit can be seen at the right next to the deep-cut curve (peak at 1.25 h in FIG. 3). To this end, the control means 17 is given a greatly increased set flow-rate value which is to be reached within a specific period, for instance, after a total of 30 minutes from the beginning of the trending phase. To enable the actual flow rate curve 30 of the flow rate to follow the calculated increase, the opening angle of the outflow regulator 16 is increased stepwise, as shown by curve 70. As can be seen from the right portion of the spectrum, this leads, after some time, to a situation in which a distinct increase in the opening angle (see the two peaks in curve 70 in the right edge portion of the spectrum) no longer entails an increase in flow rate 30 as is desired (see right upper corner of the diagram in which the flow curve is oriented downwards although the opening angle curve has strong peaks. In such a situation the raking machine (see curve 40) is slightly lowered, thereby contributing to the increase in flow rate. Finally, when either the opening angle of the outflow regulator has reached a maximum value, for instance 80% of its total opening angle, or when the upper outflow value has been reached, the trending phase will be terminated.

Figure 4:
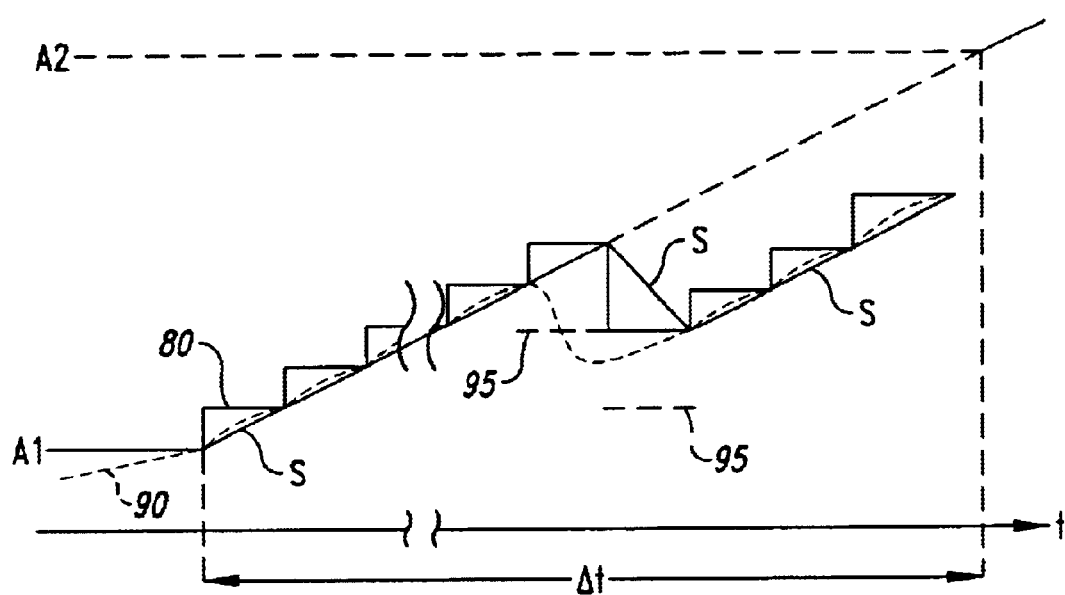
FIG. 4 diagrammatically illustrates the desired flow rate value and the actual flow rate value as a function of time.

If in the course of the trending phase the desired flow rate increase is no longer attained, the set value, i.e. the flow rate per time unit, can be reduced at the same time as the lowering of the raking machine and the resultant loosening of the grain bed. Such a situation is illustrated in FIG. 4. Lautering of the wort is, for instance, assumed to begin at an outflow value of 200 hl. Such a value represents the first outflow value A1 and is fixed, for instance, for the duration of 5 minutes. The trending phase will then start. An increased second outflow value A2 of for instance 560 hl is predetermined. The second increased outflow value is to be reached within one hour. When the control means is given this time value, it will calculate a rise (S) in the flow rate per time unit of 360 hl per hour, or 2 hl every 20th second. On the basis of the first flow rate value A1, this value is now increased by 2 hl every 20th second in a kind of staircase function. The flow rate value 80 which is now desired after the first 20 seconds is 202 hl. It is found out by comparing this desired value with the actually measured real value 90 whether the desired value has been reached within the period set therefor. If this is the case, the instantaneous flow rate value of 202 hl is again increased by 2 hl to 204 hl. After 20 seconds have passed, a comparison is again made to find out whether the newly desired flow rate value of 204 hl corresponds to the actual real value. This procedure will be repeated until the second flow rate value A2 of 560 hl has been reached. In view of the given set value (S) and the rise of 360 hl per hour or 2 hl every 20th second, this should be the case after one hour.

In addition to the respectively desired flow rate value 80, control means 17 calculates a lower limit value 95 for the actual flow rate 90, the lower limit value 95 being, for instance, 4 hl below the respectively desired flow rate value 80. Should the desired flow rate value 80 not be reached in the course of the trending phase, and should the actual real value 90 for the flow rate rather fall below the limit value 95 for the flow rate, the set value (s) will be decreased by a predetermined amount. For instance, the set value of formerly 2 hl every 20th second may be lowered by lowering the desired flow rate value by 4 hl every 20th second. This means that, at a desired flow rate value of, for instance, 380 hl after a running time of 30 minutes of the trending phase, said value is reduced by reducing the desired flow rate value to 376 hl. On the basis of this newly desired flow rate value 80, a new lower limit value of 372 hl which is reduced by the same amount of 4 hl every 20th second is now calculated. If this new limit value of 372 hl is also not reached within the next time interval of 20 seconds, the above sequence will be repeated until a lower limit value for the flow rate is reached. At the same time, when the first lower limit value is not reached, the control means 17 lowers the raking machine, whereby the grain bed is loosened and the flow rate is increased. If the flow rate is not lowered any more, so that it is not possible to fall below a further limit value, the instantaneously desired flow rate value 80 will be maintained until the flow rate remains constant over a predetermined period of time or increases again. As soon as this is the case, the trending phase will be continued with the original increase value or set value (s) of 2 hl every 20th second so as to increase the flow rate per time unit, i.e., a desired flow rate value of 376 hl is again increased by 2 hl every 20th second to 378 hl.

Since the set value is reduced, resulting in a lowering of the flow rate, the grain bed cannot get stuck on account of a suction effect, which would otherwise be the case with an increasing opening of the outflow regulator 16 for achieving an increased flow rate. In such a case it would only be possible to loosen the grain bed solidified in this manner by way of a deep cut, which is not desired.

As becomes apparent from the diagram according to FIG. 3, it is possible with the method of the invention in the illustrated embodiment to lauter a total lauter amount of about 650 hl within a period of about 100 minutes, whereas 150 to 165 minutes are required for this purpose for a similar amount in the method described in EP-A-0362 793. The method of the invention thus entails very considerable advantages with respect to the shortening of the total lauter time. Moreover, an individual adaptation to the most different conditions is possible due to the performance of the trending phase and in view of the respectively given conditions by setting different second outflow values (upper flow value), so that it is possible to shorten the lauter time under the most different preconditions.

What is claimed is:

1. A method for controlling a wort outflow from a lauter tun during a brewing process, the lauter tun having wort therein, the lauter tun having an outflow pipe connected thereto for conveying the wort from the lauter tun at an outflow rate, and the lauter tun having an outflow regulator adapted to control the wort outflow, comprising the steps of:
   measuring a first wort outflow rate;
   selecting a predetermined second and increased outflow rate different from the first;
   selecting a predetermined time interval for reaching the second outflow rate;
   determining the incremental outflow rate increase per unit time corresponding to such change in outflow rate in such time interval; and
   using a value corresponding to the incremental outflow rate increase per unit of time as a set point for the control means for controlling the wort outflow.

2. The method according to claim 1 wherein a regulating valve defines a flow opening that the wort outflow passes through, and the step of using a value corresponding to the incremental outflow rate increase per unit of time includes varying the flow opening of the regulating valve.

3. The method according to claim 1 wherein the lauter tun has a regulating valve positionable to a plurality of opening angles to regulate the wort outflow rate, and further including the step of regulating the regulating valve to move the regulating valve to a selected one of the opening angles and thereby regulating the wort outflow rate thereby using the regulating valve as the outflow regulator.

4. The method according to claim 1 wherein the lauter tun has a grain bed therein and a raking device is provided in the lauter tun, the raking device being adjustable vertically relative to the grain bed, and the method includes the step of adjusting the raking device vertically to increase the wort outflow rate toward the second outflow value.

5. The method according to claim 1 wherein at least one phase of the brewing process is a trending phase, the method includes the step of monitoring the first wort outflow rate as the first wort outflow rate is increasing toward, the second outflow value and varying the second outflow value from an original value during the trending phase if a rate of increase in the wort outflow rate is less than the outflow rate increase per unit time by a predetermined amount.

6. The method according to claim 5 wherein the second outflow value is reduced if a selected increase flow rate of the wort is not reached in the course of the trending phase.

7. The method according to claim 5 wherein the second outflow value is reduced from the original value.

8. The method according to claim 7 wherein the second outflow is increased to the original value after the second outflow value has been reduced, if the rate of increase in the wort outflow rate of the wort is constant over a predetermined period.

9. A device for brewing and controlling a wort outflow from the brewing device, comprising:
   a lauter tun;
   a discharge pipe connected to said lauter tun for carrying said wort away from the lauter tun;
   a flow meter connected thereto, the flow meter being positioned to measure wort outflow;
   an outflow regulator coupled thereto for controlling the flow of wort from the lauter tun through the discharge pipe; and
   a discharge control connected to the outflow regulator and to receive the outflow values from the flow meter, the discharge control being configured to provide control signals for controlling the outflow using a value corresponding to an incremental outflow rate per unit of time as a set point, such incremental outflow rated based on a first wort outflow rate measured by the flow meter, a selected predetermined second and increased outflow rate different from the first, and a selected predetermined interval for reaching the second outflow rate.

10. The device according to claim 9 wherein said outflow regulator is a lauter flap.

11. The device according to claim 9 wherein said outflow regulator is a regulating valve.

12. The device according to claim 9 further including a raking device arranged in the lauter tun and vertically movable relative to the lauter tun.

13. The device according to claim 12 wherein the lauter tun has a grain bed therein and the raking device is provided in the lauter tun, the raking device being adjustable vertically relative to the grain bed, and the discharge control actuates the raking device vertically to increase the wort outflow rate toward the second outflow value.

* * * * *